(12) United States Patent
Wilson et al.

(10) Patent No.: US 6,974,120 B2
(45) Date of Patent: Dec. 13, 2005

(54) SOLENOID FUEL DRAIN VALVE

(75) Inventors: Steven Paul Wilson, Doncaster (GB);
Robert Brown, Dewsbury (GB);
Phillip R. Core, Scarcroft (GB);
Svetlana Ferrari, Wakefield (GB)

(73) Assignee: Parker Hannifin (UK) Ltd., Hemel Hempstead (GB)

( * ) Notice: Subject to any disclaimer, the term of this patent is extended or adjusted under 35 U.S.C. 154(b) by 189 days.

(21) Appl. No.: 10/616,057

(22) Filed: Jul. 9, 2003

(65) Prior Publication Data

US 2004/0046142 A1   Mar. 11, 2004

(30) Foreign Application Priority Data

Jul. 11, 2002  (GB) .................................. 0216115

(51) Int. Cl.[7] ............................................. F16K 31/02
(52) U.S. Cl. ............................ 251/129.21; 137/614.11;
137/614.18; 137/628; 137/630.19; 137/630.22
(58) Field of Search ............... 251/129.21; 137/614.18,
137/614.11, 628, 630.19, 630.22

(56) References Cited

U.S. PATENT DOCUMENTS

| | | | | |
|---|---|---|---|---|
| 208,986 | A | * | 10/1878 | Patterson ................ 137/614.18 |
| 4,611,627 | A | | 9/1986 | Eidsvoog et al. |
| 4,637,351 | A | | 1/1987 | Pakula |
| 4,708,171 | A | | 11/1987 | Cudaback |
| 4,724,074 | A | | 2/1988 | Schaupp |
| 5,307,991 | A | * | 5/1994 | Hanson et al. .......... 251/129.21 |
| 5,606,989 | A | | 3/1997 | Roll et al. |
| 6,105,884 | A | * | 8/2000 | Molnar et al. .......... 251/129.21 |
| 6,109,543 | A | * | 8/2000 | Bright et al. ........... 251/129.21 |
| 6,258,269 | B1 | | 7/2001 | Knight |
| 6,467,495 | B2 | * | 10/2002 | Shost ..................... 251/129.21 |
| 6,530,558 | B1 | * | 3/2003 | Schulz ................... 251/129.21 |
| 6,548,837 | B1 | * | 4/2003 | Vaz De Azevedo et al. ..................... 251/129.21 |

FOREIGN PATENT DOCUMENTS

| | | |
|---|---|---|
| EP | 0 777 046 | 4/1977 |
| EP | 0 150 120 | 7/1985 |
| EP | 0 168 160 | 1/1986 |
| EP | 0 213 889 | 8/1987 |
| EP | 0 553 919 | 8/1993 |
| EP | 1 081 371 | 3/2001 |
| FR | 2 533 667 | 3/1984 |
| GB | 2 109 901 | 7/1983 |
| WO | 89/05685 | 6/1989 |
| WO | 90/07666 | 7/1990 |
| WO | 93/01874 | 2/1993 |
| WO | 01/33069 | 5/2001 |
| WO | 01/94773 | 12/2001 |
| WO | 01/96731 | 12/2001 |

OTHER PUBLICATIONS

Copy of International Search Report from PCT Application No. PCT/GB03/02995.

* cited by examiner

Primary Examiner—John Bastianelli
(74) Attorney, Agent, or Firm—Christopher H. Hunter (57) ABSTRACT

A solenoid fuel drain valve (2) comprising a valve body (4), having a drain hole (20) and an air inlet opening (22), a solenoid coil (10) and a piston, the drain hole (20) having a drain inlet (20) and a drain outlet (15); and the piston being arranged within the valve body (4) to be moveable between a closed condition, wherein the drain hole (20) and the air inlet opening (22) are sealed, and an open condition, wherein the drain hole (20) and the air inlet opening (22) are open, movement of the piston being controlled by the solenoid (10).

21 Claims, 6 Drawing Sheets fig 1

SOLENOID FUEL DRAIN VALVE

RELATED CASES

The present application claims priority to United Kingdom Patent Application Ser. No. 0216115.6; filed Jul. 11, 2002, the disclosure of which is expressly incorporated herein by reference.

BACKGROUND OF THE INVENTION

This invention relates to solenoid fuel drain valves, in particular, although not exclusively, to solenoid drain valves for use in automotive fuel systems.

Fuel systems, generally comprise a fuel filter to remove water and other contaminates from the fuel. The fuel filter is generally part of a closed system. It is preferable to periodically remove the water and other contaminates from the fuel filter.

This may be achieved using a manual fuel drain valve. The operator of a manual fuel drain valve periodically releases the water and other contaminates by rotating the drain valve. Water and contaminates can be released from the fuel filter by draining through a first hole in the valve as air enters the fuel filter through a further hole in the valve.

A manual fuel drain valve is inconvenient because the fuel filter is often positioned in an awkward location in an automotive engine and is not easily accessible.

As an alternative, solenoid activated fuel drain valves have been developed. Solenoid fuel drain valves are electrically operated. A solenoid fuel drain valve may be controlled automatically by, for example, an engine control system, or mechanically by, for example, activation of a switch by an operator.

To operate a solenoid fuel drain valve, a solenoid coil is activated to cause a plunger to be pulled from a closed position to an open position. In order to allow water and other contaminates to be released from the fuel filter the fuel system must be pressurised. In some arrangements, residual pressure from the fuel system provides enough pressure for the water and other contaminates to flow through the drain valve when opened by the solenoid. In other arrangements, it may be possible to mount the fuel filter below the fuel tank to create the required pressure difference. Otherwise, a means of pressuring the fuel system must be provided in addition to the solenoid fuel drain valve, in order to provide for drainage of the water and other contaminates through the valve when the valve in opened by the solenoid.

In automotive engines in particular, it is not always possible to arrange the fuel filter below the fuel tank, and provision of additional pressurisation means adds undesirable expense to the manufacturing and maintenance costs.

SUMMARY OF THE INVENTION

It is an object of preferred embodiments of the present invention to provide an improved solenoid fuel drain valve.

The present invention provides a solenoid fuel drain valve comprising a valve body, having a drain hole and an air inlet opening, a solenoid coil and a piston, the drain hole having a drain inlet and a drain outlet, and the piston being arranged within the valve body to be moveable between a closed condition, wherein the drain hole and the air inlet opening are sealed, and an open condition, wherein the drain hole and the air inlet opening are open, movement of the piston being controlled by the solenoid.

The valve body may be a unitary body. Alternatively, the valve body may comprise a plurality of units connected together for use thereof. For example, the valve body may comprise a solenoid housing and a solenoid adapter, which solenoid adapter is attached to the solenoid housing.

The valve body suitably defines an interior chamber, into which the drain hole and the air inlet opening open. The valve body suitably further comprises attachment means for connecting the solenoid fuel drain valve to a fuel filter for use of the valve. The valve body may comprise one or more torque limiter to prevent over compression of the valve body against a fuel filter during attachment thereto for use.

The valve body may further comprise an air passage, connecting the air inlet opening to an air source. The air source may be provided by venting the air inlet opening to the exterior of the valve body.

The valve body may comprise more than one air inlet opening. Provision of more than one air inlet opening advantageously facilitates draining in a non-horizontal orientation of the vehicle. Each air inlet opening may be connected to an air source by means of an air passage. Each air inlet opening may comprise a separate air passage, or two or more of the air inlet openings may share part at least of one air passage.

If the valve comprises a more than one air inlet opening, each of the plurality of air inlet openings is suitably spaced equidistantly from the others about the valve body.

It should be noted that reference to an air inlet opening, and air passage and an air source is not intended to limit the invention to use only with atmospheric air. As will be clear to a skilled person the invention could be used with any fluid, preferably a gas, which is suitable for use in the fuel filter.

The valve body may further comprise a drain passage, connecting the drain inlet to a drain outlet.

Part or all of the drain passage may be provided by a drain tube located within the valve body.

Suitably, in use of a valve according to the present invention, the valve is arranged such that the air inlet is located above the drain outlet.

The piston suitably comprises a rod and a head. The head may be attached to the rod. Alternatively, the head may be separate from the rod and moved by means of the rod.

The head is suitably adapted to provide a means for sealing at least one of the drain hole and the air inlet when the piston is in the closed condition. The head may be adapted to seal each of the drain hole and the one or more air inlet openings.

The piston may comprise two or more heads, each of which may be independently attached to or separate from the rod. For example, the piston may comprise two heads, one arranged to seal the drain hole and one arranged to seal the one or more air inlet openings when the piston is in the closed condition.

The valve may be adapted such that, in use, the drain valve and the one or more air inlet openings are simultaneously opened by movement of the piston from the closed condition to the open condition, and vice versa. Alternatively, the valve may be adapted such that, in use, the drain valve and the one or more air inlet openings are sequentially opened as the piston moves from the closed to the open condition, and vice versa.

The piston may be arranged in the valve body such that part at least of the rod extends through the drain hole. If the valve body comprises a drain passage, the piston is suitably arranged in the valve body such that part at least of the rod extends through part at least of the drain passage.

Suitably, a solenoid drain valve according to the present invention further comprises a solenoid armature of magnetisable material attached to the piston. Preferably, the solenoid armature is connected to the piston rod. The solenoid armature and the piston are suitably arranged such that energization and de-energization of the solenoid effects movement of the armature, which in turns causes movement of the piston. The armature is suitably located at least partly within the solenoid coil.

A valve according to the present invention may further comprise a solenoid stem of magnetisable material. The solenoid stem and the solenoid armature are suitably arranged within the valve such that energization of the solenoid coil causes a magnetic field to be induced in the solenoid stem and in the solenoid armature. In this embodiment, the solenoid armature is then attracted to the solenoid stem, and movement of the piston is effected.

A valve according to the present invention may further comprise biasing means to bias the piston into either the open or closed condition. In this case, the solenoid is then suitably arranged to generate sufficient force to overcome the biasing force following energization in order to facilitate movement of the piston.

The biasing means is suitably one or more springs. Any suitably form of spring may be used.

The one or more spring is suitably arranged to act against the head of the piston. If the piston comprises two or more heads, the valve preferably comprises one spring for each head.

A solenoid fuel drain valve according to the present invention may further comprise a retaining surface arranged to provide a surface against which the biasing means may act to provide the biasing force.

In use of a solenoid fuel drain valve according to the present invention, the piston is suitably in the closed condition when the solenoid coil is not energised. When the engine is not in operation, the valve can be opened to allow water and other contaminates to leave the fuel filter.

In use, the solenoid coil is preferably energised by the engine battery. Energization of the solenoid coil creates a magnetic field inside the coil. Generation of the magnetic field causes the piston to move within the valve body.

Movement of the piston effects opening of the drain hole and the one or more air inlet openings.

De-energization of the solenoid causes the piston to move from the open condition to the closed condition, and thereby causes the drain hole and the one or more air inlet openings to be closed.

A solenoid fuel drain valve may be used in conjunction with a water probe, which water probe is suitably positioned in the fuel filter and detects the level of water present in the fuel filter. The engine control system could then be set to activate the solenoid fuel drain filter, or to indicate to the operator that activation is due, when a pre-set level of water is detected in the fuel filter. Alternatively, the solenoid fuel drain valve can be set to operate periodically, as appropriate.

BRIEF DESCRIPTION OF THE DRAWINGS

The present invention will now be described, by way of example only, with reference to the following drawings, in which.

DETAILED DESCRIPTION OF THE PREFERRED EMBODIMENT

FIGS. 1 to 4 show a solenoid fuel drain valve 2 having a valve body 4 comprising a solenoid housing 6 and a solenoid adapter 8.

Figure 1:
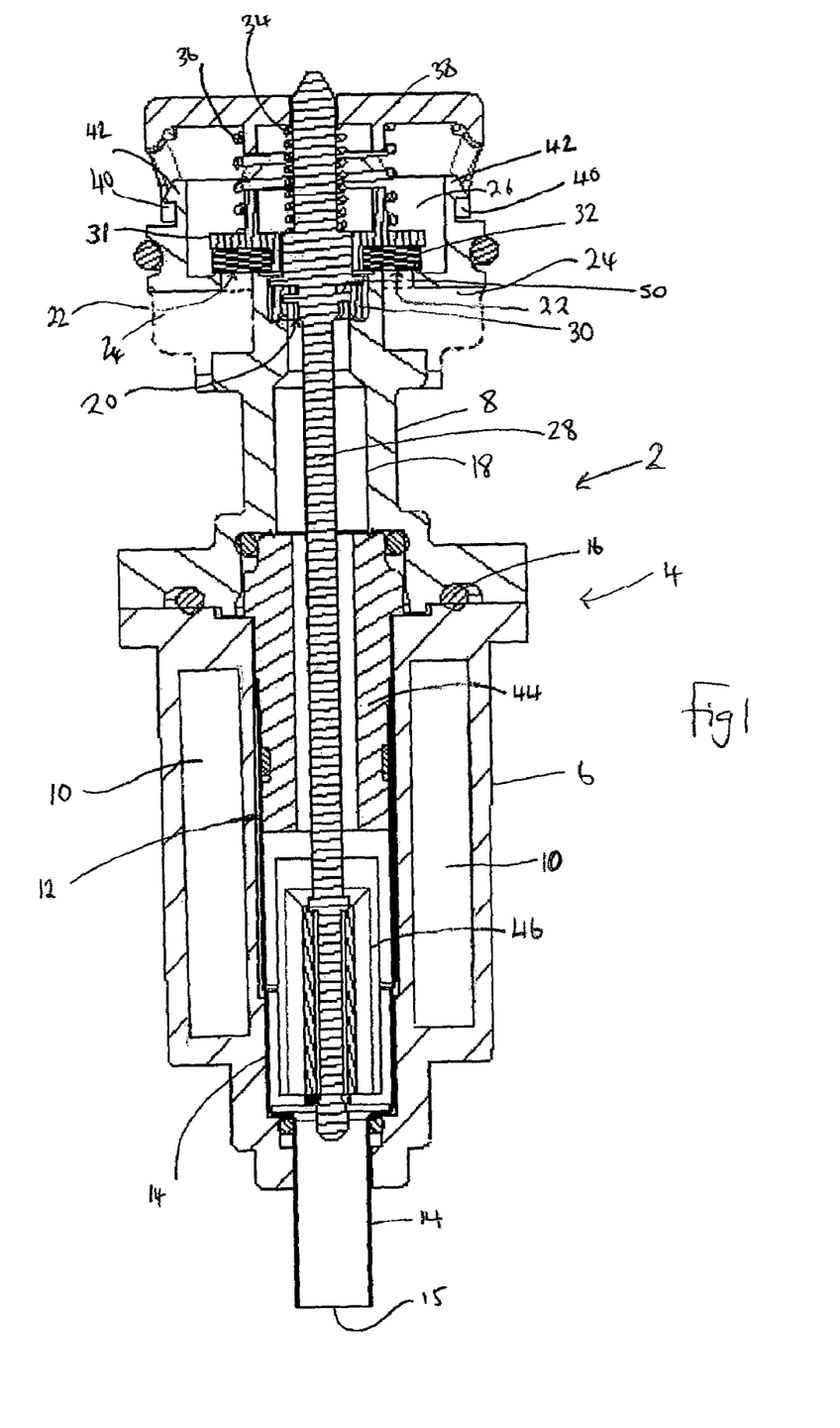
FIG. 1 is a cross-sectional side view of a first embodiment of the invention.

The solenoid housing 6 contains the solenoid coil 10, and comprises a passage 12 therethrough, which provides part of the drain passage. A drain tube 14 is located within the passage 12 of the solenoid housing 6. The drain tube 14 has a stepped conformation as shown in FIG. 1. The end of the tube 14 distal the solenoid adapter 8 provides a drain outlet 15.

The solenoid adapter 8 is connected to the solenoid housing 6 by any suitable means, such as torque limiters and screws (not shown) connecting the solenoid housing 6 to a fuel filter bowl (not shown) with the solenoid adapter 8 sandwiched therebetween; a seal 16 is provided between the two parts of the valve body 4.

The solenoid adapter 8 also comprises a passage 18 providing part of the drain passage. The passage 18 connects with the passage 12 of the solenoid housing 6, when the solenoid housing 6 and the solenoid adapter 8 are connected together. Passage 18 also has a stepped conformation.

The end of the passage 18 distal the solenoid housing provides a drain inlet 20.

The solenoid adapter 8 further comprises two air inlet openings 22. Each air inlet opening 22 is connected to the exterior of the valve body 4, by means of an air passage 24.

The diameter of the air passages 24 is greater than the diameter of the air inlets 22. An advantage of this arrangement is that is reduces the likelihood of the air passage 24 becoming blocked by any water or other contaminates that may pass through the air inlet opening 22.

The solenoid adapter 8 defines an interior chamber 26 into which the drain inlet 20 and the air inlet openings 22 open.

The solenoid fuel drain valve 2 further comprises a piston having a rod 28 extending through the drain passage defined by passages 12 and 18 and drain tube 14, and into the interior chamber 26 of the solenoid adapter 8. The piston has two heads, one head comprising a head seal 30 attached to the rod 28, and the other head, comprising a head cap 31 and a head seal 32, separate from the rod 28. The rod 28 has a flange 50 extending therefrom and engaging the first head seal 30 distal the solenoid housing 6.

Figure 2:
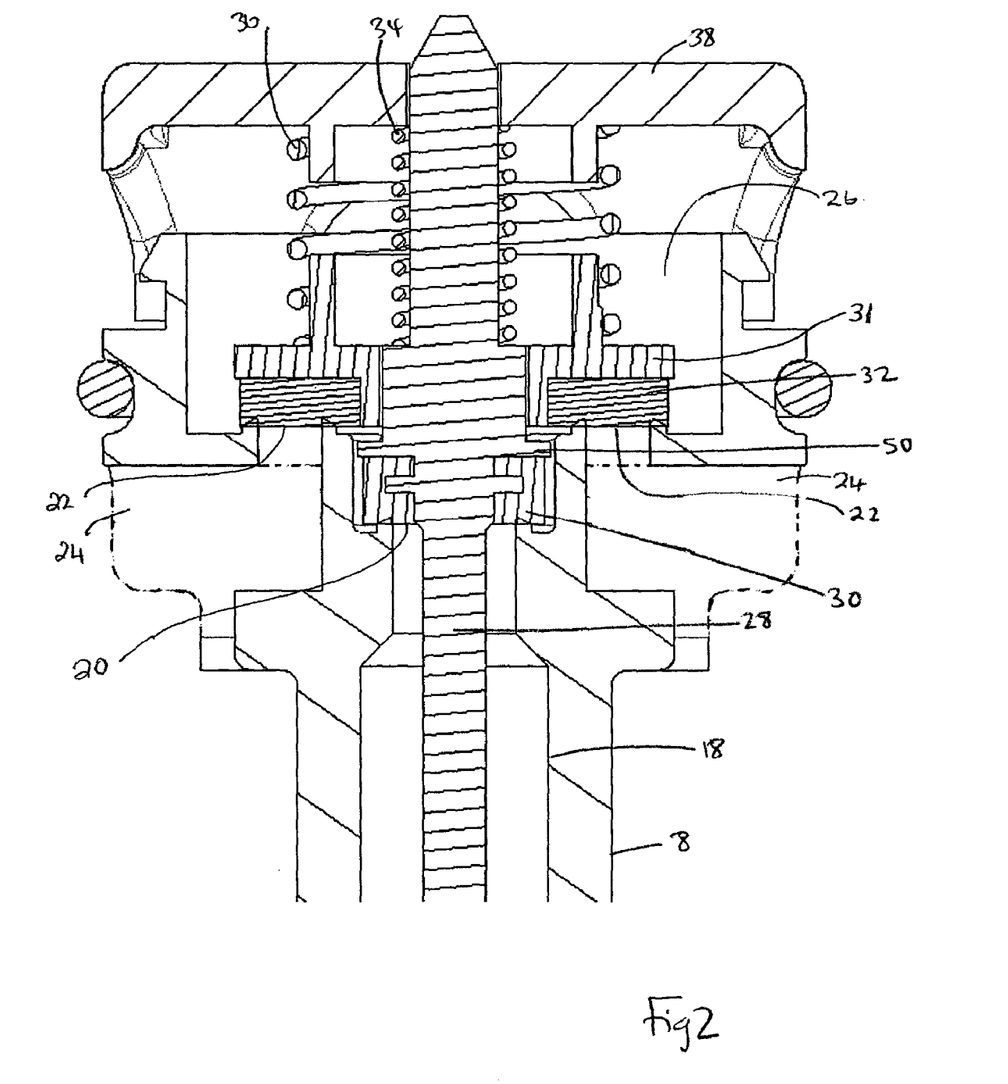
FIG. 2 shows an enlarged view of a section of the embodiment of FIG. 1 illustrating a first phase of opening of the drain hole and air inlet openings.

In the completely closed position, as shown in FIGS. 1 and 2, the first head seal 30 is in sealing contact with the drain inlet 20 and the second head seal 32 is in sealing contact with both of the air inlet openings 22.

The first and second head seals 30, 32 are maintained in the closed position by means of the biasing force applied thereto by helical springs 34 and 36. One end of each spring 34, 36 acts against a retaining device 38. The other end of the first spring 34 acts against the piston rod 28 to bias the first head seal 30 into the closed position against the drain inlet 20. The other end of the second spring 36 acts against the head cap 31 to bias the second head 32 into the closed position against the air inlet openings 22.

The retaining device 38 suitably comprises a plate-like element with collet-like arms 40 extending therefrom for attachment of the retaining device 38 onto a corresponding ridge 42 of the solenoid adapter 8. Preferably, the retaining device 38 comprises openings (not shown) therein which extend across substantially the whole surface of the retaining device 38. This allows air entering the solenoid adapter 8 though the air inlet openings 22 in use, to pass through the retaining device 38 and into a fuel filter bowl (not shown), to which the device is attached, without causing a significant blockage.

The valve 2 further comprises a body of magnetisable material acting as a solenoid stem 44 located in the drain passage provided by passages 12 and 18. In addition, a body of magnetisable material acting as a solenoid armature 46 is attached to the rod 28 of the piston, by, for example, an e-clip. The solenoid armature 46 is located further along the piston rod 28 with respect to the solenoid stem 44 distal the piston head seals 30, 32.

Seals are provided between the solenoid stem 44 and the drain tube 14, between the solenoid stem 44 and the solenoid adapter 8, between the drain tube 14 and the solenoid housing 6, and on the exterior of the solenoid adapter 8 to seal between the solenoid adapter 8 and a fuel filter bowl when the valve 2 is located for use.

In operation of the valve of FIGS. 1 to 4, the piston is in the closed position (as shown in FIGS. 1 and 2) when the solenoid coil 10 is not energised.

When the engine is not running, the valve 2 can be opened. To open the valve 2, the coil 10 is energised, suitably by means of the engine battery. This causes a magnetic field to be induced in the solenoid stem 44, and in the solenoid armature 46.

The solenoid armature 46 is then attracted to the solenoid stem 44 and so the solenoid armature 46 moves towards the solenoid stem 44. This movement of the solenoid armature 46 causes the rod 28 to move against the force of the first spring 34 and move the first head seal 30 out of sealing contact with the drain inlet 20. Thus the drain inlet 20 is opened, as shown in FIG. 3.

Figure 3:
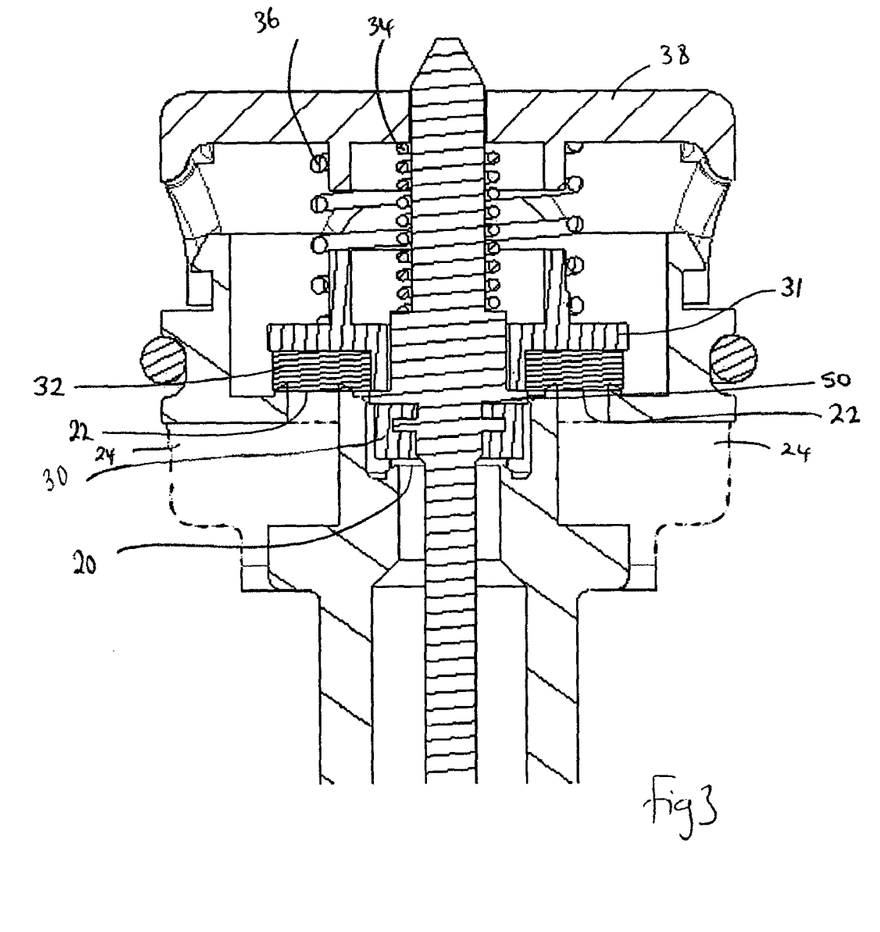
FIG. 3 shows an enlarged view of a section of the embodiment of FIG. 1 illustrating a further phase of opening of the drain hole and air inlet opening.
Figure 4:
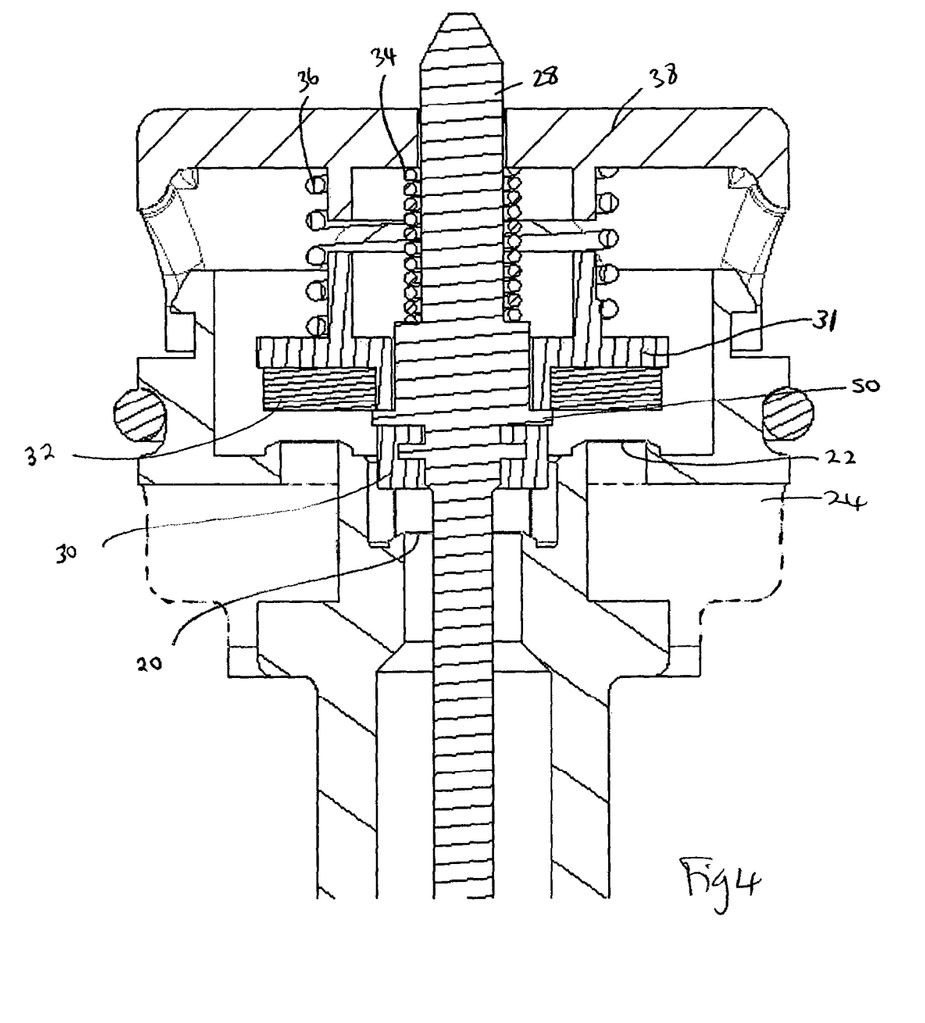
FIG. 4 shows an enlarged view of a section of the embodiment of FIG. 1 illustrating a still further phase of opening of the drain hole and air inlet opening.

The momentum of the solenoid armature 46 and piston, plus the increasing force as the distance between the solenoid armature 46b and the solenoid stem 44 reduces, causes the rod 28 to continue moving until the flange 50 of the rod 28 contacts the head cap 31 attached to the second head seal 32 (as shown in FIGS. 3 and 4). Continued movement of the rod causes the piston to move against the force of the second spring 36 and move the second head seal 32 out of sealing contact with the air inlet openings 22. Thus the air inlet openings 22 are opened, as shown in FIG. 4.

When the solenoid coil 10 is de-energised, the induced magnetic field in the solenoid stem 44 and the solenoid armature 46 will disperse and the attraction between the armature 46 and the stem 44 will be overcome by the force of the first and second springs 34, 36.

The piston will therefore be forced back towards the closed position. The second head seal 32 will contact the air inlet openings 22 first and provide a sealing engagement therewith as maintained by the second spring 36. Continued movement of the rod will cause the flange 50 to lose contact with the head cap 31 of the second head. Thereafter, the first head seal 30 will contact the drain inlet 20 and provide sealing engagement therewith as maintained by the first spring 34.

Figure 5:
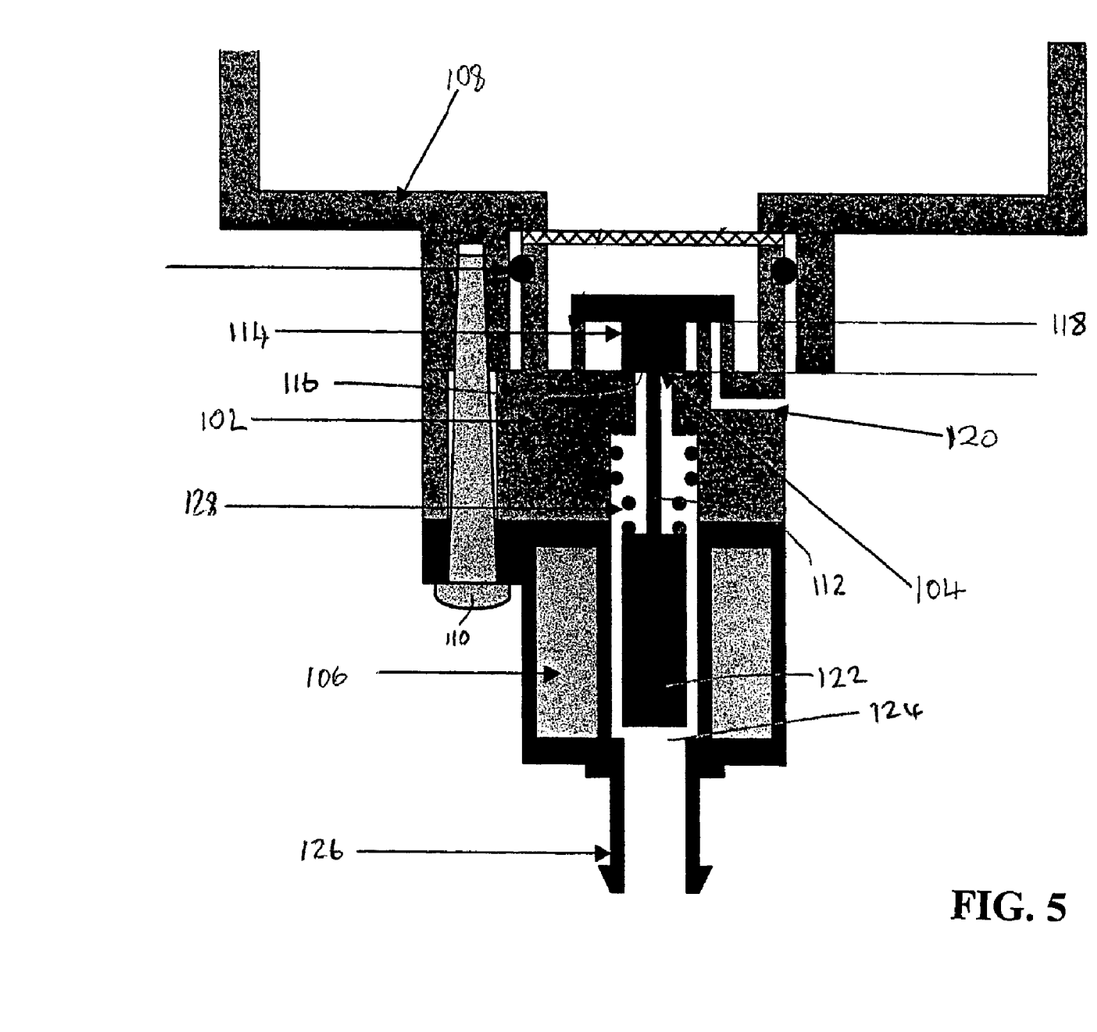
FIG. 5 is a cross-sectional side view of a second embodiment of the invention, showing the drain hole and air inlet opening in a closed condition.
Figure 6:
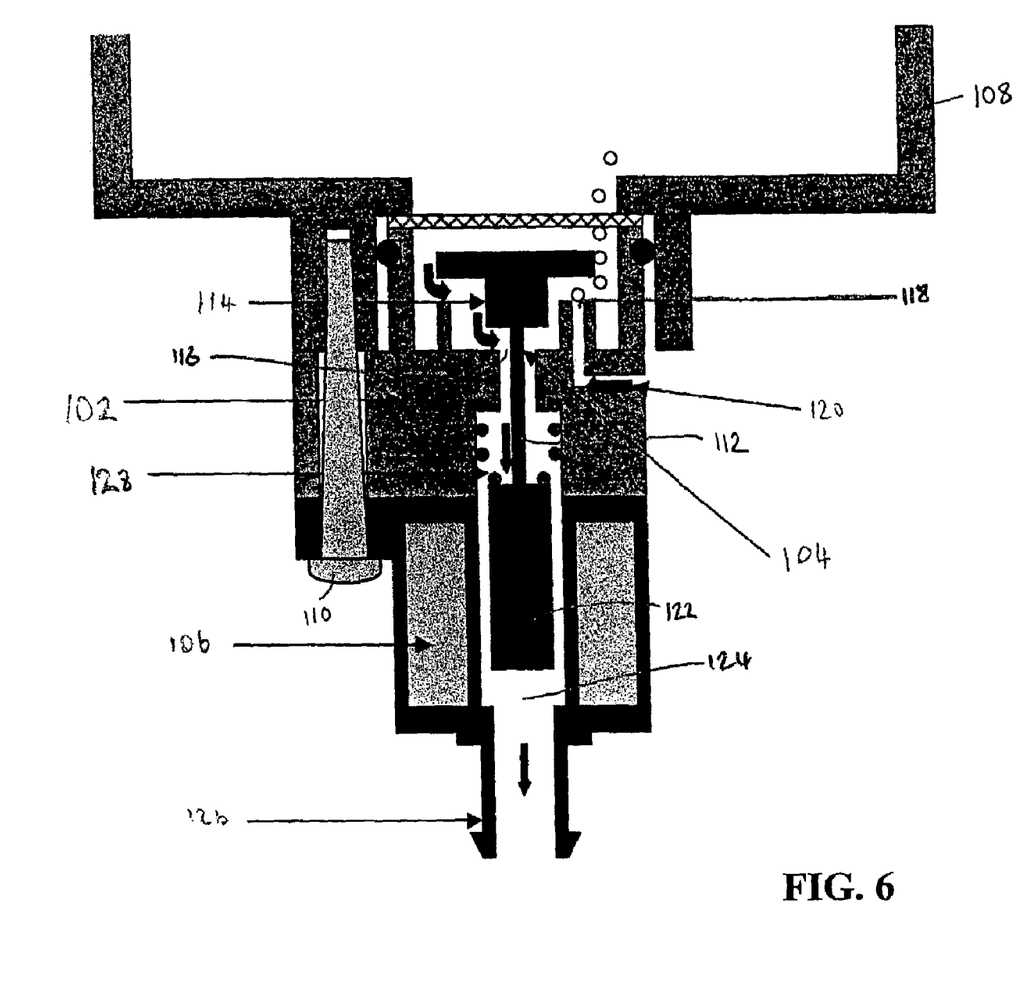
FIG. 6 shows the embodiment of FIG. 5 with the drain hole and air inlet opening in an open condition.

FIGS. 5 and 6 of the drawings show a second embodiment of the invention, comprising a solenoid fuel drain valve 100 having a solenoid adapter 102, a piston 104 and a solenoid 106.

The solenoid 106 may be an off-the-shelf product supplied by any manufacturer.

The solenoid adapter 102 screws into a bowl 108 of a fuel filter in use, but also has two connecting screws 110 fastening the solenoid 106 to it.

The piston 104 comprises a rod 112 and a head 114 attached to one end of the rod 112. The head 114 is designed to create a sealing engagement with a drain inlet 116 and an air inlet 118 of the solenoid adapter 102 when the piston 104 is in the closed condition (as shown in FIG. 5). The piston 104 slides within a drain passage 124 extending through the valve body 100 from the drain inlet 116 to the drain outlet 126.

The piston 104 further comprises a solenoid armature 122 attached to the end of the rod 112 distal the head 114. A solenoid stem (not shown) is also provided.

The air inlet 118 is the opening of an air tube 120 that connects the air inlet 118 to the exterior of the valve 100.

A spring 128 acts on the piston 104 to bias the piston into the closed condition with the head 114 in sealing engagement with the air inlet 118 and the drain inlet 116.

When there is an applied voltage to the solenoid coil, a magnetic field is created, causing the piston 104 to be drawn towards the fuel filter bowl 108 against the force of the spring 128, as shown in FIG. 6. Thus the seal between the piston head 114 and the air inlet 118 and the drain inlet 116 is broken.

Air is then drawn into the air tube 120, through the air inlet 118 and into the filter bowl 108. This breaks the air lock in the fuel system allowing fluid and other contaminates to leave the fuel bowl 108 into the solenoid adapter 102 and out of the drain outlet 126.

The reason that air can enter into the system and the air lock is overcome is because of the positioning of the air inlet 118 in relation to the drain outlet 126. The air inlet 118 is positioned higher than the lowest point of the drain tube. The difference in height creates a pressure head thus allowing air to enter the air tube 120 and fluid then to drain.

When the voltage across the coil is switched off, the magnetic field is removed. The force of the spring 128 then causes the piston 104 to return to recreate a seal with the air inlet 118 and the drain inlet 116. This stops all fluid movement and the solenoid fuel drain valve 100 is closed.

In both embodiments of the invention as described above, seals are positioned above the drain hole and the one or more air inlet openings and the biasing springs act downwards onto the seal heads. The fluid draining from the filter will act downwards onto the seal heads.

However, it will be apparent to a person skilled in the art, that the seal head and spring arrangements could be reversed to act in the opposite direction. In which case, the seal head(s) would be located below the drain hole and/or the one or more air holes when the valve is arranged for use. Also, the biasing springs would act in the opposite direction, i.e. upwards into the flow of fluid that would drain from the fuel filter in use of the valve. In this case, the orientation of the solenoid armature and the solenoid stem would also need to be reversed, such that, upon energization of the coil, the armature moves downwards away from the drain hole and one or more air inlet openings, towards the solenoid stem.

What is claimed is:

1. A solenoid fuel drain valve comprising a valve body, having a fuel chamber a drain for a closed fuel system, the solenoid drain valve hole and an air inlet opening, a solenoid coil and a piston, the drain hole having a drain inlet and a drain outlet, and the piston being arranged within the valve body to be moveable between a closed condition, wherein the drain hole and the air inlet opening are sealed, and an open condition, wherein the drain hole and the air inlet opening are open, to allow air into the system to facilitate draining of fuel from the system, movement of the piston being controlled by the solenoid.

2. A solenoid fuel drain valve according to claim 1, wherein the valve body defines an interior chamber into which the air inlet opening and the drain hole open.

3. A solenoid fuel drain valve according to claim 1, wherein the valve body comprises an air passage connecting the air inlet opening to an air source.

4. A solenoid fuel drain valve according to claim 1, wherein the valve body comprises a drain passage connecting the drain inlet to the drain outlet.

5. A solenoid fuel drain valve according to any one of the preceding claims, wherein the valve body comprises more than one air inlet opening.

6. A solenoid fuel drain valve according to claim 1, wherein the piston comprises a rod and a head.

7. A solenoid fuel drain valve according to claim 6, wherein the head is attached to the rod.

8. A solenoid fuel drain valve according to claim 6, wherein the head is separate from the rod and moved by means of the rod.

9. A solenoid fuel drain valve according to claim 6, wherein the head is adapted to provide a means of sealing at least one of the drain hole and the air inlet opening.

10. A solenoid fuel drain valve according to claim 9, wherein the head is adapted to seal both of the drain hole and the air inlet opening.

11. A solenoid fuel drain valve according to claim 6, wherein the piston comprises two or more heads, each of which may be independently attached to or separate from the rod.

12. A solenoid fuel drain valve according to claim 11, wherein the piston comprises a first head attached to the rod and a second head separate from but moved by the rod.

13. A solenoid fuel drain valve according to claim 12, wherein the rod comprises a flange extending therefrom to interact with the second head in use and effect movement of the second head upon movement of the rod.

14. A solenoid fuel drain valve according to claim 6, wherein the piston is arranged in the valve body such that part at least part of the rod extends through the drain hole.

15. A solenoid fuel drain valve according to claim 1, comprising a solenoid armature of magnetisable material attached to the piston.

16. A solenoid fuel drain valve according to claim 15, wherein the solenoid armature and the piston are arranged such that energization and de-energization of the solenoid effects movement of the solenoid armature, which in turn causes movement of the piston.

17. A solenoid fuel drain valve according to claim 15, comprising a solenoid stem of magnetisable material.

18. A solenoid fuel drain valve according to claim 17, wherein the solenoid stem is arranged within the valve body such that energization of the solenoid coil causes a magnetic field to be induced in the solenoid stem and the solenoid armature.

19. A solenoid fuel drain valve according to claim 1, comprising biasing means to bias the piston into either the closed or open position.

20. A solenoid fuel drain valve according to claim 19, wherein the biasing means is one or more spring.

21. A solenoid fuel drain valve according to claim 19, wherein the valve further comprises a retaining surface against which the biasing means acts to provide the biasing force.

* * * * *